United States Patent Office 2,912,360
Patented Nov. 10, 1959

2,912,360

PROCESS FOR OBTAINING INTRINSIC FACTOR

William E. Baum and John L. Federman, Indianapolis, Ind., assignors to Eli Lilly and Company, Indianapolis, Ind., a corporation of Indiana No Drawing. Application August 1, 1956
Serial No. 601,365

4 Claims. (Cl. 167—74)

This invention relates to a novel process for the preparation of intrinsic factor from animal tissues.

It is well known that in oral therapy of pernicious anemia certain individuals require the administration of the so-called intrinsic factor together with vitamin $B_{12}$ or preparations containing vitamin $B_{12}$, in order that they may absorb and utilize the vitamin $B_{12}$ to obtain its hematopoietic effect. The intrinsic factor, which is a substance of unknown structure, is commonly obtained from animal tissues such as hogs' stomachs, hog duodenal mucosa and the like, and as heretofore obtained has been an amorphous, relatively impure material in which the intrinsic factor is contained in greater or lesser amounts. Relatively less pure materials are commonly prepared by processes which may involve the steps of dehydration of animal tissue, defatting and extraction. From such crude preparations higher purity material can be obtained by supplementing the above procedures with precipitation of aqueous solutions with salts, dialysis and the like.

It is the object of this invention to provide a process for the preparation of intrinsic factor concentrate which is simple and rapid, and which produces, in relatively high yield, a concentrated fraction from animal tissue, which contains a suitably high concentration of intrinsic factor for convenient human oral administration.

In accordance with the above and other objects of the invention, it has been found that intrinsic factor of a potency adequate for therapeutic administration can be prepared in good yield by digesting animal tissue containing intrinsic factor activity with a proteolytic enzyme in an aqueous medium, removing the insoluble, undigested solid material therefrom, and recovering from the aqueous fraction intrinsic factor in concentrated form by evaporating the remaining aqueous solution to dryness.

The dried, somewhat hygroscopic intrinsic factor substance thus obtained produces adequate hematopoietic response in pernicious anemia patients when administered at dose levels of 20 to 50 mg. per day with a suitable amount of vitamin $B_{12}$. The substance can be administered in the form of the usual pharmaceutical preparations such as in capsules, tablets and the like, bearing in mind the labile nature of the intrinsic factor in preparations of such forms.

The proteolytic enzymes which can be employed in the process of the invention can be any proteolytic enzyme or even compatible mixtures thereof, and are exemplified by enzymes such as pepsin, pancreatin, including its components trypsin, chymotrypsin and carboxypeptidase, and the like. It will be understood that the proteolytic enzymes obtainable commercially may include amounts of other enzymes having other types of activity, such as amylolytic and lipolytic activity. The term "proteolytic enzyme" as used herein is to be understood as including enzymes of this nature as well as the highly purified proteolytic enzymes. Preferably, the enzyme which is used is trypsin, for example, that sold commercially as about "1:80" casein digestive power or "1:75" casein digestive power as in triple strength pancreatin.

The digestion of the animal tissue containing intrinsic factor is carried out at a temperature suitable for the operability of the enzyme such as a temperature in the range of about 20 to 40° C., preferably about 37° C., and at a pH range in which the enzyme has substantially maximal activity. The pH range useful in the case of pepsin is about pH 0.5 to 4.0 but preferably is about pH 3. In the case of the other enzymes named hereinabove, the range generally is about pH 6.5–8.5 but preferably is about pH 7.6. The intrinsic factor is believed to be bound by or in some way associated with some component of the protein substrate, and an absolute or precise value for the amount of intrinsic factor contained by any particular protein source of that factor cannot presently be determined. Therefore, digestion is carried out at least long enough to liberate substantial amounts of the intrinsic factor from the substrate. The duration of the digestion can range from about one to five hours or more. In general, a digestion period of about two hours yields satisfactory results. It will be understood that longer digestion may increase the yield of intrinsic factor, but that the duration of digestion must be chosen with regard to practical considerations, such as optimum yield and purity with the equipment and facilities available. The animal tissue which is employed is animal tissue which is known to contain intrinsic factor. Such include hog pylorus, hog duodenum, gastric musoca, whole hog stomachs and the like. Preferably the pyloric lining of the hog's stomach is used because of its relatively high content of the factor.

The following examples more specifically illustrate the preparation of intrinsic factor concentrates by the process of the invention.

Example 1

In a suitable tank provided with means for heating, cooling, and agitation are placed 100 liters of deionized water. The pH is adjusted to about 7.6–7.8 using dilute aqueous sodium hydroxide, and the temperature of the water is brought to about 37° C. Twenty-five grams of trypsin (1–80 casein digestive power) are added to the water and then are added 10 kilos of hog pyloric linings, ground, while frozen, in an ordinary meat grinder through a plate having 7/64 inch holes. The mixture is agitated to keep the material in suspension, and the temperature is re-established at 37° C. while allowing the pH to drift. The pH is then re-established at about 7.6–7.8 after which the temperature and pH are maintained at 37° C. and about 7.6–7.8, respectively, for about one hour. The pH of the mixture is then adjusted to pH 3.0 using about 850 cc. of 3 N hydrochloric acid. To the acidified mixture are added 0.58 g. of pepsin (1–6000 casein digestive power). Digestion is continued at 37° C. with stirring for one-half hour, maintaining the pH at 3.0 by addition of 70 cc. of 3 N hydrochloric acid. The digested mixture is promptly adjusted to about pH 4.0 using 250 cc. of 3 N aqueous sodium hydroxide, about 9.5 lbs. of diatomaceous earth-type filter aid are added with thorough agitation, and the mixture is filtered using a filter press. The press cake is washed with about 20 liters of water at pH 4.0. The combined filtrate and washings are found to contain about 0.822 g./100 cc. of solids, or a total of 904 g. The pH of the aqueous solution is then adjusted to about 6.0 with 3 N aqueous sodium hydroxide, and the slightly acid liquid is frozen, and dried from the frozen state in vacuo at a maximum temperature of about 30° C. When dry, the frozen material is ground to a powder under nonhygroscopic conditions. The material thus obtained can be administered therapeutically with a suitable dosage of vitamin $B_{12}$ in a dose of 22 mg. per day with vitamin $Co^{60}B_{12}$ to obtain a standard response in pernicious anemia patients using the Schilling assay technique. The small amount of fat present can be removed if desired by extracting the ground, dried material with naphtha. A standard response in pernicious anemia patients is likewise obtained with about 22 mg. per day of the defatted material.

For therapeutic use, the product conveniently is employed, in the amount of about 25 mg., with a suitable dosage amount of vitamin $B_{12}$ in a customary form for oral administration, for example in telescoping gelatin capsules.

*Example 2*

To a suitable extraction tank are added 611 gal. of tap water having pH about 7.5 and the temperature of the water is adjusted to 37° C. About 3.75 liters of toluene are added, followed by 500 lbs. of hogs' stomach pyloric linings, ground while frozen. The mixture is continuously agitated while maintaining the temperature at 37° C. The pH is adjusted to pH 7.4–7.8 by adding 800 cc. of 10 percent aqueous sodium hydroxide. To the stirred mixture are then added 578 g. of trypsin (1–80 casein digestive power) and digestion is carried on for two and one-half hours, maintaining the temperature at 37° C. and readjusting the pH to maintain it at a point between 7.4 and 7.8, every fifteen minutes. The amount of 10 percent aqueous sodium hydroxide added at the end of each fifteen minute interval averages about 400 cc. Immediately after the period of digestion has ended, the pH is adjusted to about pH 4.0 by the addition of 10 percent aqueous hydrochloric acid, about 4.2 liters of acid being required. To the acid mixture are then added 188 lbs. of diatomaceous earth-type filter aid, and the mixture is thoroughly agitated to disperse the filter aid uniformly throughout. The pH is again checked and 100 cc. of 10 percent aqueous hydrochloric acid are added, bringing the pH to about 3.95. The mixture is then filtered through a filter press. The filtrate is run directly into a vacuum evaporator and concentration of the filtrate is begun as soon as sufficient material is available therein. The filter press cake is washed with 125 gal. of tap water which has been adjusted to pH 4.0 by the addition thereto of 10 percent aqueous hydrochloric acid, and the washings are added to the filtrate. The filtrate is evaporated to a volume of about 22 gal., maintaining the temperature in the liquid at less than 30° C. and employing an absolute pressure of about one inch of mercury. The concentrated mixture is adjusted to pH 6.0, using about 3.5 liters of 10 percent aqueous sodium hydroxide, and placed in 24 shallow pans, each containing about 3 liters. The material is then frozen solid, and dried in a cabinet from the frozen state using an absolute pressure of about 500 microns while circulating water at a temperature of not over 30° C. through the cabinet shelves. The material is substantially anhydrous after about 60 hours in the dryer. The dried material is removed from the pans in a dry atmosphere, ground to a coarse powder, percolated with naphtha to accomplish substantial removal of fats, redried and reground to a relatively uniform powder, and placed in an airtight container. About 31.5 lbs. of intrinsic factor-containing concentrate are recovered, which upon test gives a satisfactory reticulocyte response at a dose level of 50 mg. per day when administered orally to pernicious anemia patients in relapse together with 15 mcg. (assayed microbiologically) of vitamin $B_{12}$.

*Example 3*

To a suitable extraction tank are added 100 liters of deionized water, which is warmed to 37° C. and adjusted to pH 3.0 by the addition of hydrochloric acid. To the acidified water are added 0.58 g. of 1–6,000 pepsin, followed by addition of 22 lbs. of ground pork pyloric linings. The water temperature which was lowered thereby is allowed to rise to about 37° C. over approximately a thirty-minute period. The pH of the mixture is readjusted to pH 3 by the addition of 500 cc. of 3 N aqueous hydrochloric acid, and the mixture is maintained at 37° C. with stirring for about thirty minutes. The acidity is maintained at pH 3 during the digestion by the addition of 200 cc. of 3 N hydrochloric acid. The pepsin-digested mixture is then readjusted to pH 7.6 by the addition of 800 cc. of 3 N aqueous sodium hydroxide solution, and 25 g. of 1–80 trypsin are added thereto. The mixture is stirred at 37° C. for one hour, maintaining pH 7.6 by the addition of 370 cc. of 3 N aqueous sodium hydroxide solution. The digestion is terminated by adjusting the mixture to pH 4 by the addition of 275 cc. of 3 N aqueous hydrochloric acid; and 9.5 lbs. of diatomaceous earth-type filter aid are then added with thorough mixing. The mixture is filtered using a filter press and the filter cake is washed with 20 liters of water previously adjusted to pH 4 with hydrochloric acid. The combined filtrate and washings are found to contain solids in the amount of 1.02 g. per 100 cc., or a total of about 1,070 g. The combined filtrate and washings are adjusted to pH 6.0 with 3 N aqueous sodium hydroxide solution preparatory to removing the water. When concentrated to small volume and dried according to the procedure described in Example 1, a somewhat hygroscopic solid is obtained which gives an adequate response in pernicious anemia patients when administered orally in amounts of 25 mg. per day, together with vitamin $Co^{60}B_{12}$, in the Schilling assay technique.

*Example 4*

The procedure of Example 1 is repeated, except that equivalent amounts of chymotrypsin, pancreatin, or carboxy-peptidase, respectively, are used.

Intrinsic factor concentrates are obtained in each case having activity of such degree that approximately 20–50 mg. per day administered orally to pernicious anemia patients together with vitamin $Co^{60}B_{12}$ in the Schilling assay procedure bring about an adequate response.

We claim:

1. The process for the preparation of intrinsic factor concentrate having high potency which consists essentially of digesting animal tissue containing intrinsic factor activity in an aqueous medium by the addition thereto of an enzyme selected from the group consisting of pancreatin, chymotrypsin, trypsin, and carboxypeptidase; separating out the insoluble, solid material from the aqueous, digested mixture to provide an aqueous solution containing intrinsic factor; and drying said aqueous solution to provide a high potency, intrinsic factor concentrate.

2. The process for the preparation of intrinsic factor concentrate having high potency which consists essentially of digesting animal tissue containing intrinsic factor activity in an aqueous medium at a pH in the range of about pH 7 to about pH 8.5 by the addition thereto of trypsin; separating out the insoluble, solid material from the aqueous, digested mixture to provide an aqueous solution containing intrinsic factor; and recovering the intrinsic factor concentrate having high potency from said aqueous solution containing intrinsic factor by drying said solution.

3. The process for the preparation of intrinsic factor concentrate having high potency which consists essentially of digesting animal tissue containing intrinsic factor activity in an aqueous medium at a pH in the range of about pH 7 to about pH 8.5 for a period of time sufficient to liberate the intrinsic factor in substantial amounts from said animal tissue by the addition thereto of an enzyme selected from the group consisting of pancreatin, chymotrypsin, trypsin, and carboxypeptidase; separating out the insoluble, solid material from the aqueous, digested mixture to provide an aqueous solution containing intrinsic factor; and recovering the intrinsic factor concentrate having high potency from said aqueous solution containing intrinsic factor by drying said solution.

4. The process for the preparation of intrinsic factor concentrate having high potency which consists essentially of digesting animal tissue containing intrinsic factor activity in an aqueous medium at a pH in the range of about pH 7 to about pH 8.5 by the addition thereto of pancreatin; separating the insoluble, solid material from the aqueous, digested mixture to provide an aqueous solution containing intrinsic factor; and recovering the intrinsic factor concentrate having high potency from said aqueous solution containing intrinsic factor by drying said solution.

References Cited in the file of this patent

UNITED STATES PATENTS 2,020,267   Walden _____ Nov. 5, 1935

FOREIGN PATENTS 387,641   Great Britain _____ May 1, 1931

OTHER REFERENCES

Williams: Proc. Soc. Exptl. Biol. and Med., vol. 87, No. 2, November 1954, pp. 400–405.